UNITED STATES PATENT OFFICE.

ELMORE E. BUTTERFIELD, OF FOREST HILLS, NEW YORK.

PROCESS OF RECOVERING PEPTONES AND HEMATIN FROM BLOOD.

1,403,892.  Specification of Letters Patent.  Patented Jan. 17, 1922.

No Drawing.  Application filed February 14, 1920. Serial No. 358,768.

*To all whom it may concern:*

Be it known that I, ELMORE E. BUTTERFIELD, a citizen of the United States, residing at Forest Hills, in the county of Queens and State of New York, have invented certain new and useful Improvements in Processes of Recovering Peptones and Hematin from Blood, of which the following is a specification.

My invention relates to a process for the separation and quantitative recovery of peptones, such as globin and serum proteins in a state of partial hydrolysis, and also of hematin from blood.

The process consists in thoroughly laking blood with hot water and a mineral acid to which is added pepsin. A detergent, such as fuller's earth, etc., or a suitably freshly formed precipitate, which may be produced in presence of the blood, is then added to the mixture and it is again heated. It is then filtered while hot and the filtrate after neutralization of the acid is evaporated to yield peptone.

The residue on the filters is dissolved in dilute caustic soda and filtered and the hematin in the filtrate is reprecipitated by dilute acid and separated by filtration.

A specific example of the process is as follows:

(1) Heat 1900 pounds of $H_2O$ + 20 pounds of HCl of 1.19 gravity to 45°–52° C.: (2) add 500 pounds of blood (whole or defibrinated but in liquid state): (3) mix thoroughly: (4) add 1.5 pounds of pepsin (1:3000) preferably dissolved in $H_2O$: (5) digest for 12 hours at 45°–50° C.: (6) bring to boil, add 20 pounds of detergent or one pound of sodium nucleinate and boil for 5 minutes: (7) filter while hot near 212° F. as possible: (8) evaporate filtrate, first neutralizing to absence of free mineral acid which requires about 5 pounds of NaOH. Filtrate neutralized and evaporated yields about 100 pounds or 20% of commercial peptone or practically theoretical yields from 500 pounds of blood, 13% derived from hemoglobin, 4%–5% derived from serum proteins and the balance out of a theoretically possible 20% due to NaCl of neutralization: (9) residue on filters dissolved in dilute NaOH, filtered, and hematin in filtrate reprecipitated by dilute acid, and separated by filtration.

The mechanism of the process is as follows:

The blood is added to hot dilute HCl in the given proportions, (1) to effect a solution of the hemoglobin from the corpuscular elements, otherwise pepsin will not act particularly on intact corpuscles, (2) to convert the dissolved hemoglobin as well as the serum proteins into acid albumin which is readily attacked by the pepsin.

The whole reaction proceeds with all of the elements in solution from the beginning and in fairly dilute solution to furnish a high reaction velocity.

The hematin gradually separates out as it is split off from the globin fraction of the hemoglobin molecule, the separation beginning as early as four hours and sometimes being complete within six to eight hours. The separation is greatly facilitated by boiling at the end of the reaction period which throws out practically all of the hematin with traces of undigested and coagulable protein: the detergent or precipitate of nucleic acid in statu nascendi removes traces of hematin and other coloring matter from the solution.

The following factors must be considered:

Dilution: 1 part of blood by volume to 4 volumes of $H_2O$, i. e. a dilution of 1:5 is recommended. A dilution of 1:3 (1 part blood + 2 parts water) is feasible but is workable with difficulty owing to bulkiness of hematin residue and viscosity of solution resulting in poor separation, low yields of peptone and slow filtration. Dilutions of less than 1:3 (1 part of blood + 1.75 $H_2O$) present increasing difficulties and when 1:2 (1 part blood + 1 part $H_2O$) is reached there is little or no attacking of the globin molecule and only 7% peptone out of a possible 20% is recovered. Dilutions above 1:5 are easily workable but necessitate the evaporation of large quantities of water and result in a product containing more salt and ash.

Acidity: A HCl concentration of 0.31%–0.35% is chosen rather than the theoretically accepted 0.15%–0.2% because about one-third or more of the HCl is consumed in forming acid albumin and does not contribute to acidity of the solution. If a concentration as low as 0.18% is used the filtrate will not turn congo, the yield is reduced about 15%, and filtration is difficult. If concentrations above 0.35% are used the reactions proceed well, the separation is sharp but so much alkali is required for neutralization that the resulting product will contain 15% or more salt and ash. Equivalent concentration of $H_2SO_4$ may be used in which case a barium compound is used for neutralization and clarification.

Pepsin concentration: 1.5% by weight of the protein to be digested has been found sufficient for 12 hours' digestion. In fact 1% is enough, the extra one-half of 1% being simply a factor of safety. With prolongations of the time, less than 1% may be used; and the time may be shortened by using more than 1.5%. However, in one case the convenience and rapidity of the process suffer while in the other case the cost is raised proportionately.

Time of digestion: Most all processes for commercial peptone require from 24 to 72 hours. Under the conditions stated the digestion is often complete in six hours, usually in eight hours and always within twelve hours.

The reaction mixture need not be boiled as separation into a clear liquid and flocculent masses occurs at 160° F., but the hematin masses are loose and spongy and filtration is slow. The boiling effects a compaction of the hematin and the reaction mixture filters clearly and rapidly. Sometimes the separation takes place at the temperature of the reaction (45°–50° C.) particularly in dilute solution and on prolonged digestion, but boiling is always essential to rapid filtration.

Detergent: The detergent or freshly formed precipitate removes traces of dissolved hematin and other coloring matters, yielding an almost colorless filtrate and consequently a dry peptone with a minimum of color, whiter than peptone from fibrin or meat.

While I have described my invention in detail, I desire it to be understood that the procedure may be varied without departing from the spirit of the invention.

I claim:—

1. The process of effecting a separation of the proteins of the blood from the hematin which comprises digestion of a dilute solution of the serum proteins and hemoglobin with mineral acid and pepsin, agglutinating the hematin, separating the solution of hydrolized proteins from the hematinic residue and evaporating the solution.

2. The process as claimed in claim 1 in which the hematinic residue is dissolved in a dilute solution of alkali and the hematin precipitated by a dilute acid.

3. The process as claimed in claim 1 in which the agglutination is effected by adding a detergent to the dilute solution, heating and then filtering.

4. The process as claimed in claim 2 in which the agglutination is effected by adding a detergent to the dilute solution, heating and then filtering.

In testimony whereof, I affix my signature.

ELMORE E. BUTTERFIELD.